United States Patent
Dayton et al.

(10) Patent No.: US 11,613,668 B2
(45) Date of Patent: Mar. 28, 2023

(54) ONE-COMPONENT WATERBORNE SELF-HEALING EPOXY FORMULATION

(71) Applicant: Autonomic Materials, Inc., Champaign, IL (US)

(72) Inventors: Christopher R. D. Dayton, Champaign, IL (US); Gerald O. Wilson, Champaign, IL (US); Subramanyam V. Kasisomayajula, Champaign, IL (US); Swapnil Shukla, Champaign, IL (US); Aidnel Geister R. Navarro, Champaign, IL (US); Diana Rodriguez, Champaign, IL (US)

(73) Assignee: AUTONOMIC MATERIALS, INC., Champaign, IL (US)

( * ) Notice: Subject to any disclaimer, the term of this patent is extended or adjusted under 35 U.S.C. 154(b) by 141 days.

(21) Appl. No.: 17/130,402

(22) Filed: Dec. 22, 2020

(65) Prior Publication Data

US 2021/0206992 A1 Jul. 8, 2021

Related U.S. Application Data

(60) Provisional application No. 62/957,022, filed on Jan. 3, 2020.

(51) Int. Cl.
*C09D 163/00* (2006.01)

(52) U.S. Cl.
CPC .................. *C09D 163/00* (2013.01)

(58) Field of Classification Search
CPC .................................................. C09D 163/00
USPC ........................................................ 523/201
See application file for complete search history.

(56) References Cited

U.S. PATENT DOCUMENTS

| 6,121,350 | A | 9/2000 | Cummings et al. |
| 9,850,388 | B2 | 12/2017 | Paar et al. |
| 9,914,800 | B2 | 3/2018 | Lunzer et al. |

(Continued)

FOREIGN PATENT DOCUMENTS

| CN | 104945992 A | * | 9/2015 | ............... C09D 5/08 |
| CN | 107573810 | | 1/2018 | |
| CN | 110564257 A | * | 12/2019 | ........... C09D 161/06 |

(Continued)

OTHER PUBLICATIONS

Chen et al., CN 110564257 A machine translation in English, Dec. 13, 2019 (Year: 2019).*

(Continued)

*Primary Examiner* — David T Karst
(74) *Attorney, Agent, or Firm* — Schwabe, Williamson & Wyatt, P.C.

(57) ABSTRACT

Embodiments provide a self-healing coating formulation comprised of a one component waterborne epoxy-amine adduct resin system and a microencapsulated healing agent. The self-healing coating formulation hardens to a protective material upon application to a substrate. Components in the protective material and microencapsulated healing agent are uniquely synergistic with each other such that, upon degradation of the protective material, microcapsule rupture causes release of the healing agent, whereby components of the healing agent react with components of the protective material to increase adhesion maintenance and corrosion resistance of the protective coating.

19 Claims, 16 Drawing Sheets

(56) References Cited

U.S. PATENT DOCUMENTS

2017/0166709 A1* 6/2017 Wilson .................. C08L 83/08
2019/0270865 A1 9/2019 Wilson et al.

FOREIGN PATENT DOCUMENTS

KR 10-1372758 3/2014
KR 10-2017-0052187 5/2017

OTHER PUBLICATIONS

Li et al., CN 104945992 A machine translation in English, Sep. 30, 2015 (Year: 2015).*
Hexion Specialty Chemicals, Inc., "EPON Resin 828", Sep. 2005 (Year: 2005).*
N.R. Sottos et al., Polymer, 2015, vol. 74, pp. 254-261 (published online: Jul. 21, 2015).

* cited by examiner

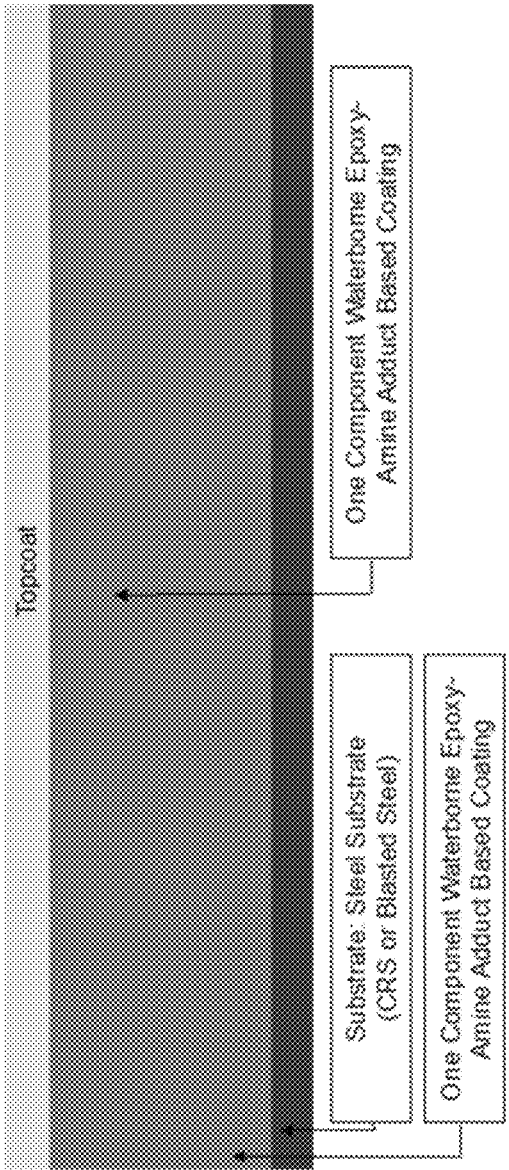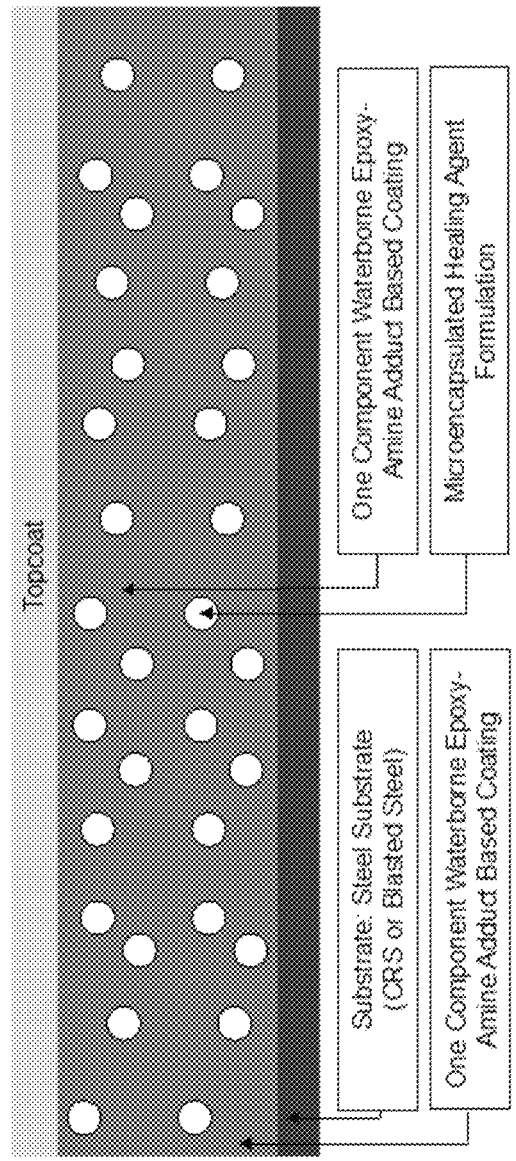
FIG. 5C
FIG. 5D

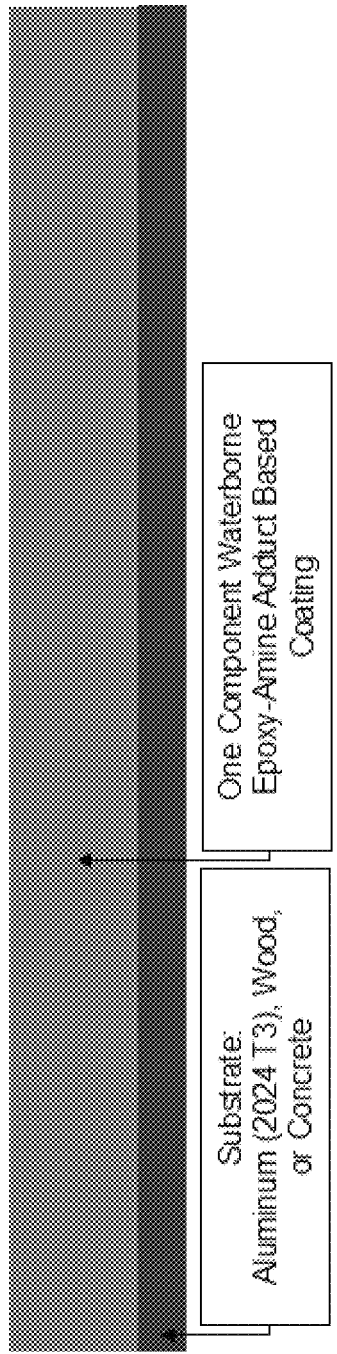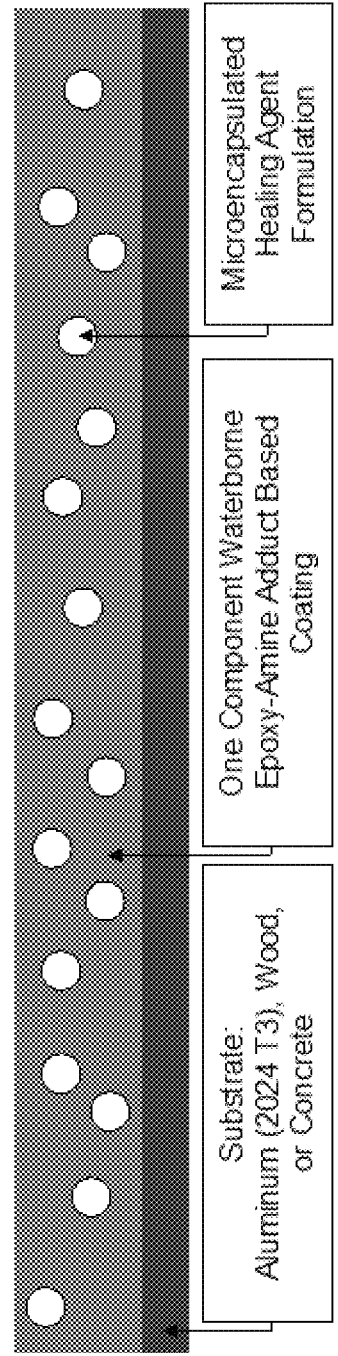
FIG. 6A
FIG. 6B

+ healing agent

- healing agent

+ healing agent

− healing agent

\+ healing agent

\- healing agent

\+ healing agent

\- healing agent

+ healing agent

- healing agent

- healing agent

FIG. 13

| Sample Set | B117 Exposure Time (h) | Substrate Preparation (SSPC-) | Coating System | First Coating Layer - Coating Chemistry | First Coating Layer - microencapsulated healing agent Loading | Second Coating Layer - Coating Chemistry | Second Coating Layer - microencapsulated healing agent Loading | Third Coating Layer - Coating Chemistry | Third Coating Layer - microencapsulated healing agent Loading | Scribe Width (Microns) | Creep (mm) | Improvement over comparative Example (%) |
|---|---|---|---|---|---|---|---|---|---|---|---|---|
| 1 | 1000 | SSPC-SP3 | Comparative Example | Epoxy-Amine Adduct | - | Styrenated Acrylic | - | - | - | 155 | 3.8 | - |
|   |   |   | Comparative Example | Epoxy-Amine Adduct | - | Styrenated Acrylic | - | - | - | 500 | 4.0 | - |
|   |   |   | Inventive Example | Epoxy-Amine Adduct | 2.5wt% | Styrenated Acrylic | - | - | - | 155 | 1.4 | 63 |
|   |   |   | Inventive Example | Epoxy-Amine Adduct | 2.5wt% | Styrenated Acrylic | - | - | - | 500 | 1.5 | 63 |
| 2 | 1000 | SSPC-SP3 | Comparative Example | Epoxy-Amine Adduct | - | Hydroxyl-Functional Acrylic | - | - | - | 155 | 5.8 | - |
|   |   |   | Comparative Example | Epoxy-Amine Adduct | - | Hydroxyl-Functional Acrylic | - | - | - | 500 | 7.1 | - |
|   |   |   | Inventive Example | Epoxy-Amine Adduct | 5wt% | Hydroxyl-Functional Acrylic | - | - | - | 155 | 1.4 | 76 |
|   |   |   | Inventive Example | Epoxy-Amine Adduct | 5wt% | Hydroxyl-Functional Acrylic | - | - | - | 500 | 1.5 | 79 |
| 3 | 2000 | SSPC-SP10 | Comparative Example | Epoxy-Amine Adduct | - | Epoxy-Amine Adduct | - | - | - | 155 | 14.2 | - |
|   |   |   | Comparative Example | Epoxy-Amine Adduct | - | Epoxy-Amine Adduct | - | - | - | 500 | 10.9 | - |
|   |   |   | Inventive Example | Epoxy-Amine Adduct | 5wt% | Epoxy-Amine Adduct | 5wt% | - | - | 155 | 6.4 | 55 |
|   |   |   | Inventive Example | Epoxy-Amine Adduct | 5wt% | Epoxy-Amine Adduct | 5wt% | - | - | 500 | 4.9 | 55 |
| 4 | 1000 | SSPC-SP10 | Comparative Example | Zinc Rich Primer | - | Epoxy-Amine Adduct | - | Hydroxyl-Functional Acrylic | - | 155 | 10.4 | - |
|   |   |   | Comparative Example | Zinc Rich Primer | - | Epoxy-Amine Adduct | - | Hydroxyl-Functional Acrylic | - | 500 | 9.9 | - |
|   |   |   | Inventive Example | Zinc Rich Primer | - | Epoxy-Amine Adduct | 2.5wt% | Hydroxyl-Functional Acrylic | - | 155 | 1.9 | 82 |
|   |   |   | Inventive Example | Zinc Rich Primer | - | Epoxy-Amine Adduct | 2.5wt% | Hydroxyl-Functional Acrylic | - | 500 | 3.4 | 66 |

ONE-COMPONENT WATERBORNE SELF-HEALING EPOXY FORMULATION

This application claims the priority benefit of the earlier filing date of U.S. Provisional Patent Application No. 62/957,022, filed Jan. 3, 2020, which is specifically incorporated herein by reference in its entirety.

TECHNICAL FIELD

Embodiments herein relate to the field of epoxy coatings, and, more specifically, to a one-component waterborne epoxy coating based on an epoxy-amine adduct resin that when combined with a microencapsulated healing agent containing an epoxy resin exhibits surprising adhesion maintenance and corrosion resistance after degradation.

BACKGROUND

Demand for low volatile organic component (VOC) coatings that are easy to apply and capable of protecting assets in a broad range of corrosive environments is steadily increasing. Waterborne coatings are a desired approach for reducing these VOCs. However, waterborne coatings have traditionally been incapable of exhibiting a level of performance that is comparable to that of solvent-based coatings.

Nevertheless, waterborne coatings have become a larger and growing portion of the coatings market for the protection of a broad range of substrates as they provide a less hazardous and more eco-friendly alternative to solvent-borne coatings. The use of waterborne formulations also comes with the added benefit of easier equipment clean up and drastically reduced health, safety, and environmental risks that accompany the use of traditional solvent based coatings.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 2A depicts vials immediately after solvent was added to the cured resin. FIG. 2B depicts vials after 4 hours at ambient lab conditions.

FIG. 3A illustrates a lap joint coated with the one component waterborne epoxy-amine adduct resin system to create a 1 inch×1 inch coated area. FIG. 3B illustrates an assembled lap joint of a control. FIG. 3C illustrates an assembled lap joint with healing agent formulation applied between cured epoxy-amine adduct coated pieces.

FIGS. 5A-5D illustrate waterborne epoxy-amine adduct-based coating systems applied on steel substrates or on steel substrates primed with a zinc rich primer. FIG. 5A depicts one coat of a comparative coating formulation followed by a topcoat. FIG. 5B depicts one coat of the formulation of the present disclosure (e.g., one-component waterborne epoxy-amine adduct-based coating) incorporating a microencapsulated healing agent formulation followed by a topcoat. FIG. 5C depicts two coats of a comparative coating formulation followed by a topcoat. FIG. 5D depicts two coats of the formulation of the present disclosure incorporating a microencapsulated healing agent formulation followed by a topcoat.

FIGS. 6A-6B illustrate waterborne epoxy-amine adduct-based systems on non-ferrous and porous substrates: FIG. 6A depicts a comparative coating formulation. FIG. 6B depicts the formulation of the present disclosure incorporating the microencapsulated healing agent formulation.

FIG. 7A depicts the comparative waterborne epoxy-amine adduct-based system. FIG. 7B depicts the formulation of the present disclosure incorporating 2.5 wt. % of the microencapsulated healing agent formulation.

FIG. 8A depicts the comparative waterborne epoxy-amine adduct-based system and FIG. 8B depicts the present waterborne epoxy-amine adduct-based system incorporating 5 wt. % of the microencapsulated healing agent formulation.

FIG. 9A depicts the comparative one-component waterborne epoxy-amine adduct-based system. FIG. 9B depicts the present one-component waterborne epoxy-amine adduct based system incorporating 2.5 wt. % of the microencapsulated healing agent formulation.

FIG. 10A depicts the comparative one-component waterborne epoxy-amine adduct-based coating. FIG. 10B depicts the formulation of the present disclosure incorporating 2.5 wt. % of microencapsulated healing agent formulation.

FIG. 11A depicts the comparative one-component waterborne epoxy-amine adduct-based coating. FIG. 11B depicts the formulation of the present disclosure incorporating 2.5 wt. % of microencapsulated healing agent formulation.

FIG. 12A depicts the comparative one-component waterborne epoxy-amine adduct-based coating. FIG. 12B depicts the formulation of the present disclosure incorporating 2.5 wt. % of microencapsulated healing agent formulation.

FIG. 13 is a table showing adhesion loss from scribe for one-component waterborne epoxy-amine adduct-based systems on steel substrates and steel substrates primed with a zinc rich primer. The comparative examples do not include any microencapsulated healing agent. The test examples, in accordance with embodiments herein, incorporate an epoxy-amine adduct-based resin system and a microencapsulated healing agent formulation. Sample sets 1, 2, and 3 are three unique coating formulations but with all three comprising a waterborne epoxy-amine adduct based resin system. Sample set 4 uses the same waterborne epoxy-amine adduct based resin system formulation as Sample Set 1 but is applied over a zinc rich primer.

DETAILED DESCRIPTION OF DISCLOSED EMBODIMENTS

Figure 1:
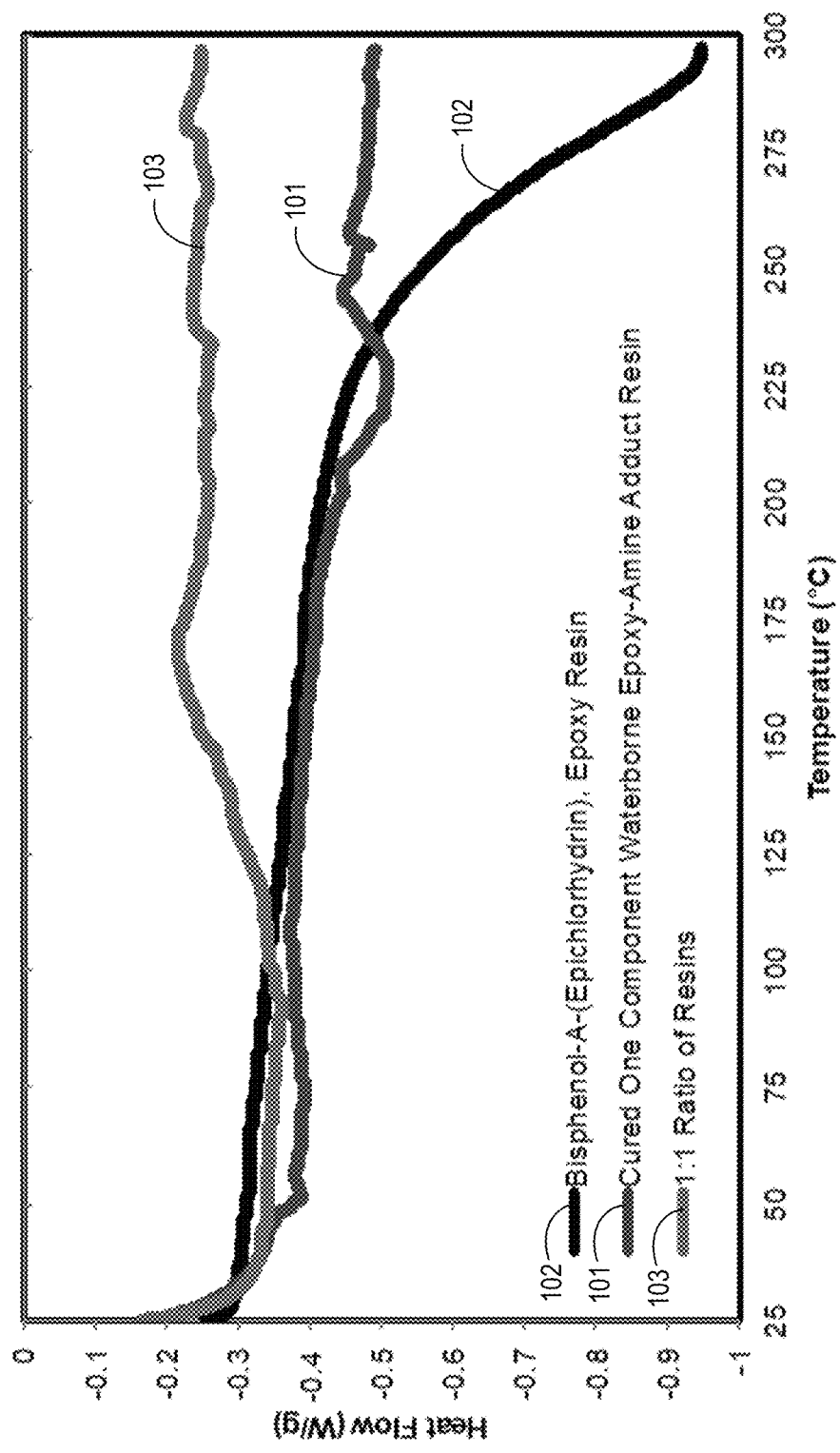
FIG. 1 illustrates Differential Scanning calorimetry (DSC) profiles of a standard Bisphenol-A-(Epichlorohydrin) Epoxy Resin and a cured one-component waterborne epoxy-amine adduct resin system acquired separately and in a 1:1 combination by weight.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a self-healing coating formulation. The self-healing coating formulation may, upon application to a substrate, harden to form a protective coating or sealant. The self-healing coating formulation may be comprised of a one-component waterborne epoxy-amine adduct resin system and a microencapsulated healing agent. The one-component waterborne epoxy-amine adduct resin system and the microencapsulated healing agent may be synergistic with each other such that the coating formulation exhibits improved adhesion maintenance and corrosion resistance of the coating following a level of damage (e.g., degradation) to the coating system that exposes the underlying substrate.

In embodiments, a coating system containing these base building blocks (e.g., one-component waterborne epoxy-amine adduct resin system and microencapsulated healing agent) exceeds the performance of another formulation containing the resin alone, without the microencapsulated healing agent, in terms of adhesion maintenance and corrosion resistance.

A one-component waterborne resin system of the present disclosure may comprise an epoxy amine-adduct resin system. This resin chemistry is based on a one-component epoxy system including pre-reacted epoxide groups, stabilized in water at low pH. When this stabilized pre-reacted resin system is applied to a substrate and the water in the matrix evaporates from the system, it allows these pre-reacted particles to coalesce and form an epoxy coating matrix that cures rapidly. This, in turn, removes the need to formulate two separate components to make an epoxy coating, and removes the need for mixing two components prior to application in the field. Advantages include an all-around simpler, easier, and less hazardous coating.

As an example, the one-component may comprise a waterborne epoxide self-cured with inactivated amines that are activated upon the evaporation or removal of the water. Discussed herein, amines may refer to simple amines and polyamines. Such a composition may be generated by first emulsion polymerizing epoxide in an alkaline amine-containing medium. The reaction may then be stopped through neutralization and inactivation of the amines. Spreading the resulting composition in a thin film layer and subsequent evaporation of water may activate the amines in the composition which cures the epoxy. It is within the scope of this disclosure that the one-component waterborne resin systems of the present disclosure further comprise pigments or other particulate matter, reactive or non-reactive resins and polymers, flow control agents, pigment grinding aids, and the like.

Self-healing coatings based on microencapsulation are a new class of smart coating technologies. These technologies can increase the lifetime of coating systems and the underlying substrates they protect via in situ autonomic repair of damage in the coating. Embodiments herein are directed to self-healing functionality realized via the incorporation of particular microencapsulated healing agent formulations into a one-component epoxy coating formulation. It is herein demonstrated that the addition of self-healing functionality to a waterborne epoxy coating formulation facilitates maintenance of adhesion of the coating system at the site of damage and surprisingly may even increase the adhesive strength of the film at the damaged area.

Accordingly, an embodiment includes a self-healing coating formulation that comprises a one-component waterborne resin system, and a healing agent encapsulated within a microcapsule. The self-healing coating formulation may harden to form a protective coating or sealant when applied to a substrate.

It may be understood that there may be any number (e.g., a plurality) of microcapsules associated with such a self-healing coating formulation. In examples, the microcapsule is comprised of a shell wall (e.g., polymeric shell wall). In examples, the shell wall may be comprised of one or more of urea-formaldehyde, melamine formaldehyde, polyacrylate, polyurea, poly(ethylene-co-maleic anhydride), and polyurethane. In examples, the microcapsule(s) are of an average diameter between 5 and 50 microns. In some examples, the average diameter is 25 microns or less.

In an example of the self-healing coating formulation, the healing agent may further comprise one or more of an epoxy resin, a solvent (e.g., polar aprotic solvent), and an alkoxysilane. The alkoxysilane may be one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane. In a particular example, the alkoxysilane is a glycidyl alkoxysilane. For example, the glycidyl alkoxysilane may be one or both of 3-glycidoxypropyltrimethoxysilane and 3-glycidoxypropyltriethoxysilane. Discussed herein, the alkoxysilane comprises an adhesion promoter and corrosion inhibitor. In some examples, a healing agent corresponding to a self-healing coating formulation may exclude (e.g., not include) the alkoxysilane, while enabling the self-healing coating formulation to retain the self-healing properties discussed herein. For example, it is herein contemplated that a self-healing coating formulation of the present disclosure excluding alkoxysilane may be used for surfaces that do not corrode.

In an example of the self-healing coating formulation, the polar aprotic solvent may be hydrophobic. In examples, the polar aprotic solvent may comprise one or more of the following properties. In examples, the polar aprotic solvent may have a miscibility with water of 5 g/L or less, for example 3-5 g/L, or 1-3 g/L, or 1-5 g/L, or 0.1-5 g/L, or 0.1-3 g/L, or 0.1-1 g/L, or 0.1-0.5 g/L, or even less than 0.1 g/L. Miscibility at least less than 5 g/L may be advantageous in terms of the self-healing coating formulations discussed herein for stabilizing an oil-in-water emulsion for microencapsulation of the healing agent. Specifically, encapsulation efficiency may decrease as solvent miscibility increases.

In examples, the polar aprotic solvent may have a boiling point of 190° C. or greater. For example, the boiling point of the aprotic solvent may be selected to be in a range between 190° C. and 300° C., for example, between 190° C. and 250° C. The boiling point above at least 190° C. may ensure utility on assets that have a high surface temperature.

In examples, the polar aprotic solvent may have a vapor pressure of less than or equal to 0.5 mmHg at 25° C. For example, between 0.1-0.5 mmHg, or between 0.05 mmHg and 0.5 mmHg, or even lower than 0.05 mmHg. The vapor pressure less than or equal to 0.5 mmHg at 25° C. may allow for sufficient time for the healing agent, upon rupture of a microcapsule, to flow into a site of degradation to facilitate the self-healing response. In other words, solvents with vapor pressures greater than 0.5 mmHg at 25° C. may evaporate at a rate that degrades an ability of the healing agent to reach/access sites of degradation, thereby degrading the self-healing properties of the coating formulation.

In examples, the polar aprotic solvent may have a dielectric constant of greater than 5. Specifically, the dielectric constant of the solvent as pertaining to the self-healing coating formulations discussed herein are used as a measure of polarity. Increased polarity is advantageous in terms of one or more of penetration of the coating network, promotion of chain entanglement, and reactivity with available amine functionality.

In some examples, the polar aprotic solvent may comprise all of the above properties, specifically a miscibility with water of 5 g/L or less, a boiling point of 190° C. or greater, a vapor pressure of 0.5 mmHg or less at 25° C., and a dielectric constant of 5 or greater. However, in other examples it is within the scope of this disclosure that the polar aprotic solvent not include all of the above-mentioned properties, but may include just one, or just two, or just three, of the above-mentioned properties.

Accordingly, in examples, the polar aprotic solvent may comprise one or more of benzyl acetate, ethyl phenyl acetate, phenylacetate, hexyl acetate, octyl acetate, phenethyl acetate, and nitrobenzene. In other examples, the polar aprotic solvent may comprise one or more of at least benzyl acetate, ethyl phenyl acetate, phenylacetate, hexyl acetate, octyl acetate, phenethyl acetate, nitrobenzene, tetrahydrofuran (THF), dichloromethane, N-methyl-2-pyrrolidone (NMP), dimethyl sulfoxide (DMSO), acetonitrile, dimethylacetamide (DMA), and dimethylformamide (DMF).

In an example of the self-healing coating formulation, the epoxy resin may further comprise bisphenol-A-(epichlorohydrin) epoxy resin. Specifically, the resin may be produced by combining epichlorohydrin and bisphenol A to yield bisphenol A diglycidyl ether epoxy resin. It is within the scope of this disclosure that instead of bisphenol A, other bisphenols (e.g., bisphenol F) or brominated bisphenols (e.g., tetrabromobisphenol A) can be used to form epoxy resins of the present disclosure.

In examples, the healing agent may include the epoxy resin between 5 wt. % and 95 wt. % (e.g., 5-10 wt. %, or 10-20 wt. %, or 20-30 wt. %, or 30-40 wt. %, or 40-50 wt. %, or 50-60 wt. %, or 60-70 wt. % or 70-80 wt. %, or 80-90 wt. %, or 90-95 wt. %). In examples, the healing agent may include the polar aprotic solvent between 5 wt % and 95 wt. % (e.g., 5-10 wt. %, or 10-20 wt. %, or 20-30 wt. %, or 30-40 wt. %, or 40-50 wt. %, or 50-60 wt. %, or 60-70 wt. % or 70-80 wt. %, or 80-90 wt. %, or 90-95 wt. %). In examples, the healing agent may include the alkoxysilane between 0 wt. % and 10 wt. % (e.g., 0-1 wt. %, or 1-2 wt. %, or 2-3 wt. %, or 3-4 wt. %, or 4-5 wt. %, or 5-6 wt. %, or 6-7 wt. %, or 7-8 wt. %, or 8-9 wt. %, or 9-10 wt. %).

In examples, the one-component waterborne resin system may further comprise an epoxy amine-adduct resin system. Discussed herein, such a waterborne resin system (e.g., epoxy amine-adduct resin system) may be prepared by emulsifying an epoxy resin in water, followed by reaction with an amine one or more times, and then stabilization using an acid. Such an epoxy amine-adduct system is described, for example, in U.S. Pat. No. 6,121,350.

Another embodiment comprises a method for protecting a substrate. The method may comprise applying a formulation to the substrate, the formulation including a one-component waterborne resin system and a healing agent encapsulated within one or more microcapsules (e.g., a plurality of microcapsules). The formulation may harden to form a protective material upon application to the substrate. Degradation of the protective material may result in rupture of the microcapsule at a site of the degradation and release of the healing agent.

In such a method, the one component waterborne resin system may further comprise an epoxy amine-adduct resin system. The healing agent may further comprise an epoxy resin, a polar aprotic solvent, and an alkoxysilane.

In an example of such a method, release of the healing agent responsive to microcapsule rupture may promote a non-covalent entanglement of oligomeric components of the epoxy amine-adduct resin system. Release of the healing agent may additionally or alternatively promote a covalent cross-linking reaction between the epoxy resin present in the healing agent and amine groups available in the protective material.

In examples of such a method, the epoxy resin may further comprise bisphenol-A-(epichlorohydrin). The polar aprotic solvent may be one or more of benzyl acetate, ethyl phenyl acetate, phenylacetate, hexyl acetate, octyl acetate, phenethyl acetate, nitrobenzene, chlorobenzene, tetrahydrofuran (THF), dichloromethane, N-methyl-2-pyrrolidone (NMP), dimethyl sulfoxide (DMSO), acetonitrile, dimethylacetamide (DMA), and dimethylformamide (DMF). The alkoxysilane may be one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane.

In examples of such a method, the microcapsule may further comprise a polymeric shell wall. The polymeric shell wall may be comprised of one or more of urea-formaldehyde, melamine formaldehyde, polyacrylate, polyurea, poly (ethylene-co-maleic anhydride), and polyurethane. In examples, an average diameter of the microcapsule(s) may be between 5 and 50 microns. In some examples, the average diameter of the microcapsules may be less than 25 microns.

In examples of such a method, the degradation may further comprise one or more of a mechanical failure, a scratch, a crack, a cut, or other breach of an integrity of the protective material. In some examples, rupture of the microcapsule and release of the healing agent at the site of degradation reduces corrosion by limiting moisture and electrolyte ingress as compared to the protective material lacking the encapsulated healing agent. In examples, the substrate is one of steel, aluminum, concrete and wood.

In one example, applying the formulation to the substrate may further comprise coating the substrate with a primer that includes an inorganic coating binder to form a first coating layer. Applying the formulation may further comprise coating the primer with an organic coating that includes an organic coating binder to form a second coating layer. The formulation may then be applied on top of the second coating layer as an overcoat layer. In such an example, the primer may further comprise a zinc-rich primer. Discussed herein a zinc-rich primer may pertain to an inorganic or organic coating, and zinc content may be greater than 20% by weight, greater than 30% by weight, greater than 40% by weight, greater than 50% by weight, greater than 60% by weight, greater than 70% by weight, greater than 80% by weight, or even greater than 90% by weight. In some examples, the primer additionally includes the microcapsule(s) comprised of encapsulated healing agent, however in other examples the primer does not additionally include the microcapsule(s) without departing from the scope of this disclosure. In some examples, the inorganic coating binder may be a silicate binder (e.g., alkyl silicate binder). In some examples, the organic coating binder may be an epoxy resin cured by one or more of the following curing agents: amine, polyamine, anhydride, aminosiloxanes, imidazole, polyamide, ketamine, modified amines that are reaction products of amines and other compounds, mercaptan and polymercaptan, polysulfide, thiols, boron trifluoride-amine complexes, organic acid hydrazide, photo and ultraviolet curing agents. In examples, the first coating is mist-coated (e.g., watered down and applied in a thin coating) with the second coating.

In another embodiment, a method of maintaining adhesion of a protective material to a substrate following degradation of the protective material comprises applying, to the substrate, a waterborne epoxy coating formulation that includes a healing agent encapsulated within a microcapsule (e.g., plurality of microcapsules), wherein the waterborne epoxy coating formulation hardens to form the protective material upon its application to the substrate. Degradation of the protective material may result in rupture of the microcapsule(s) and release of the healing agent at a site of the degradation, thereby maintaining adhesion of the protective material to the substrate.

In an example of such a method, degradation of the protective material may result from one or more of a mechanical failure, a scratch, a crack, a cut, or other breach of an integrity of the protective material.

In an example of such a method, the waterborne resin system is an epoxy amine-adduct resin system, and the healing agent further comprises an epoxy resin, a polar aprotic solvent, and an alkoxysilane.

In another example of such a method, rupture of the microcapsule and release of the healing agent maintains adhesion of the protective material to the substrate via chemical reaction between amine groups corresponding to the epoxy amine-adduct resin system and the epoxy resin of the healing agent, and a swelling of the protective material via the aprotic solvent that enables entanglement between oligomeric resin components of the protective material.

In examples of the method, the epoxy resin further comprises bisphenol-A-(epichlorohydrin). The polar aprotic solvent may be one or more of benzyl acetate, ethyl phenyl acetate, phenylacetate, hexyl acetate, octyl acetate, phenethyl acetate, nitrobenzene, chlorobenzene, tetrahydrofuran (THF), dichloromethane, N-methyl-2-pyrrolidone (NMP), dimethyl sulfoxide (DMSO), acetonitrile, dimethylacetamide (DMA), and dimethylformamide (DMF). The alkoxysilane may be one or more of one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane. The microcapsule(s) may further comprise a polymeric shell wall that is comprised of one or more of urea-formaldehyde, melamine formaldehyde, polyacrylate, polyurea, poly(ethylene-co-maleic anhydride), and polyurethane. A diameter of the microcapsule may be less than 25 microns.

Via the use of a one-component waterborne epoxy coating, embodiments herein provide a low-volatile organic compound (VOC) system that is a one-component coating leveraging a synergy between the microencapsulated healing agent and novel solvent promoted entanglement of oligomeric components of the epoxy amine-adduct resin system, as well as the crosslinking of the epoxy resin released from the ruptured microcapsules by available amine groups during a healing event. In examples, VOCs are kept below 50 g/L of coating formulation. For example, 45 g/L or less, or 40 g/L or less, or 35 g/L or less, or 30 g/L or less, or 25 g/L or less, or 20 g/L or less, or 15 g/L or less, or 10 g/L or less or 5 g/L or less, or even formulations that release no VOCs are within the scope of this disclosure.

Discussed herein, the healing agent may also be referred to as a core formulation. In particular embodiments, the core formulation is comprised of an epoxy resin, a hydrophobic polar aprotic solvent, and an alkoxysilane, more specifically a glycidyl alkoxysilane and even more specifically (3-Glycidyloxypropyl)trimethoxysilane).

In an embodiment where the microcapsules are incorporated into a one-component waterborne epoxy coating, the one-component waterborne epoxy coating may maintain its adhesion with an underlying metal substrate (or other substrate including wood, plastic, concrete, etc.). Incorporation of the capsules into a one component waterborne epoxy coating may also improve a barrier property of the coating following damage (e.g., degradation).

In embodiments, the coating or coating system (e.g., self-healing coating system) incorporating the microcapsules described above exhibits improvements in adhesion maintenance and corrosion resistance after degradation that exposes the underlying substrate.

In embodiments, the coating or coating system (e.g., self-healing coating system) incorporating the microcapsules described above as well as a one-component waterborne epoxy amine adduct resin system exhibits improvements in adhesion maintenance and corrosion resistance after damage on a range of metal surfaces including but not limited to blasted steel surfaces, lightly abraded cold-rolled steel, lightly abraded aluminum substrates, and other poorly prepared metal substrates.

In embodiments, the coating system described above exhibits improved maintenance of adhesion on a concrete surface following a level of damage that exposes the underlying substrate.

In embodiments, the coating system described above exhibits improved maintenance of adhesion on a wood surface following a level of damage that exposes the underlying substrate.

As discussed, embodiments herein provide a synergy between the healing agent and the cured epoxy-amine adduct resin system. Embodiments provide a self-healing waterborne epoxy formulation comprised of an epoxy-amine adduct resin system and a microencapsulated healing agent formulation that is further comprised of an epoxy resin, a polar aprotic solvent, and a glycidyl alkoxysilane solution. When the cured formulation is damaged, the embedded microcapsules are ruptured and the healing agent present within the capsules is released into the site of damage, where it promotes non-covalent entanglement of oligomeric components of the resin system as well as a covalent cross-linking reaction between the epoxy resin present in the healing agent and which is released into the site of damage and amine groups available in the cured resin system.

This unique synergy between a microencapsulated healing agent containing an epoxy resin and a resin system comprised of an epoxy-amine adduct starts with the fact that microcapsules embedded in the cured epoxy-amine adduct resin system or a coating formulation comprised of the resin system will be ruptured when the cured resin or coating is damaged releasing the healing agent into the site of damage. The healing agent when in the site of damage will interact with the cured epoxy amine-adduct resin system. This interaction of healing agent and cured resin system will be comprised of two mechanisms that will result in improved adhesion at the site of damage, which serves to minimize ingress of moisture and electrolytes that would ordinarily lead to corrosion at the site of damage. The first of these two mechanisms includes a reaction between amine groups available in the cured epoxy-amine adduct and the epoxy resin delivered to the site of damage. The second includes the ability of the polar aprotic solvent to swell the cured epoxy amine-adduct material to allow new entanglement between oligomeric resin components available within the resin system. Together, these two mechanisms combine into a uniquely high performing self-healing response.

Evidence for the first mechanism, the ability of amines present in the cured epoxy-amine adduct resin system to react with the epoxy resin present in the healing agent, is provided via data from differential scanning calorimetry (DSC) experiments shown in FIG. 1. The results were obtained by the procedure outlined below in Example 1. The data shows that there are no significant exotherms observed for either the cured one-component waterborne epoxy-amine adduct resin 101 or the Bisphenol-A-(Epichlorohydrin) epoxy resin 102. However, when the two are combined 103 there is a noticeable exotherm given off that is consistent with crosslinking of epoxide functionality present in the Bisphenol-A-(Epichlorohydrin) epoxy resin. This mechanism is also consistent with the fact that the epoxy amine-adduct resin is produced by pre-reacting epoxy resins with amines. This reaction is then stopped and stabilized in water with the use of acid. When this resin is applied in a thin film, the water evaporates allowing the reaction to progress to form a cured film. Residual amine groups remain available, however, that can be exploited by the healing agent to form a thermosetting film at the site of damage.

Figure 2A:
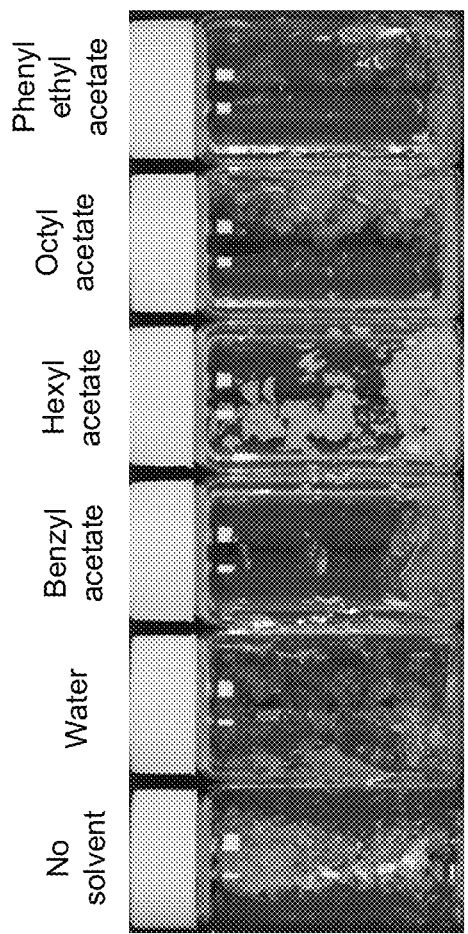
FIGS. 2A-2B show solvent exposure of a cured sample of a one component waterborne epoxy-amine adduct resin. One part of the cured resin was mixed with nine parts of the specified solvent. The resin/solvent samples, from left to right are as follows: control (no solvent), water, benzyl acetate, hexyl acetate, octyl acetate, and phenyl ethyl acetate.
Figure 2B:
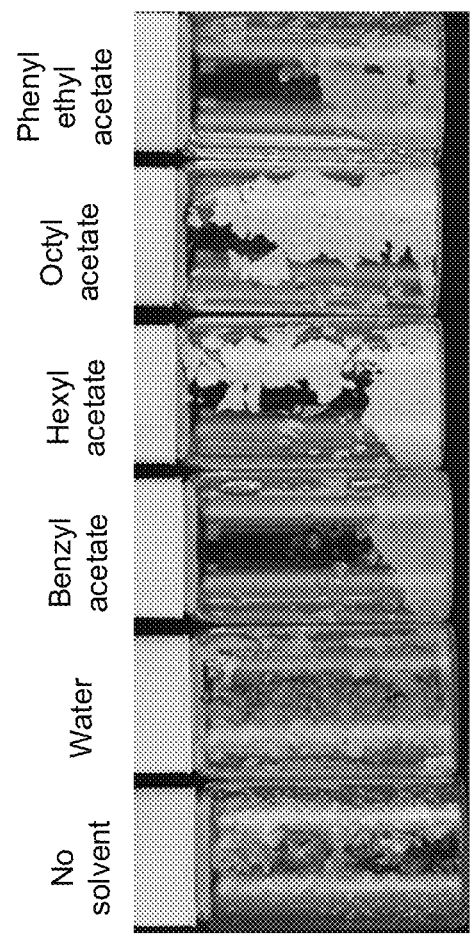

The second mechanism includes the ability of a solvent to swell the cured epoxy-amine adduct resin system allowing it to re-coalesce thereby promoting the formation of new chain entanglements. Support for this second mechanism is provided by the experiment outlined in Example 2 and results provided in FIGS. 2A-2B. FIG. 2A shows samples of the cured one-component waterborne epoxy-amine adduct resin system immediately after addition of a series of solvents along with a control which included the cured epoxy-amine adduct without addition of solvent. After four hours (FIG. 2B), the epoxy amine-adduct that was not exposed or exposed only to water still remained as individual flakes and was not observed to coalesce together. However, the epoxy amine-adduct that was exposed to the solvents softened and coalesced together, suggesting the promotion of plasticization and coalescence by the solvents added. For each of FIGS. 2A-2B, one part of the cured resin was mixed with nine parts of the specified solvent. The resin/solvent samples, from left to right are as follows: control (no solvent), water, benzyl acetate, hexyl acetate, octyl acetate, and phenyl ethyl acetate.

Figure 3A:
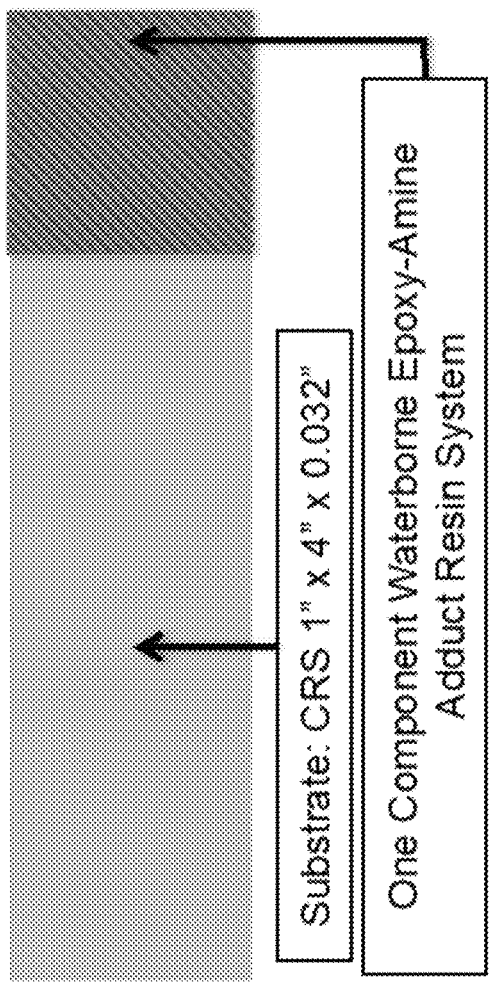
FIGS. 3A-3C illustrate preparation of lap shear joints for shear strength testing.
Figure 3B:
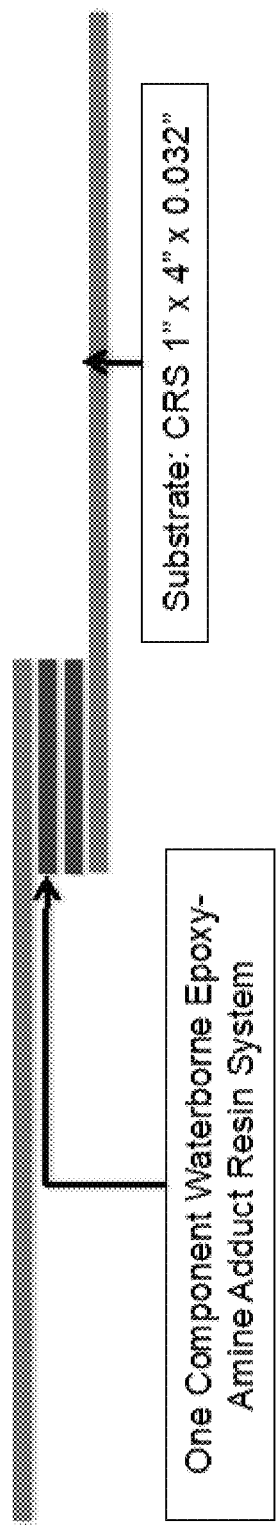
Figure 3C:
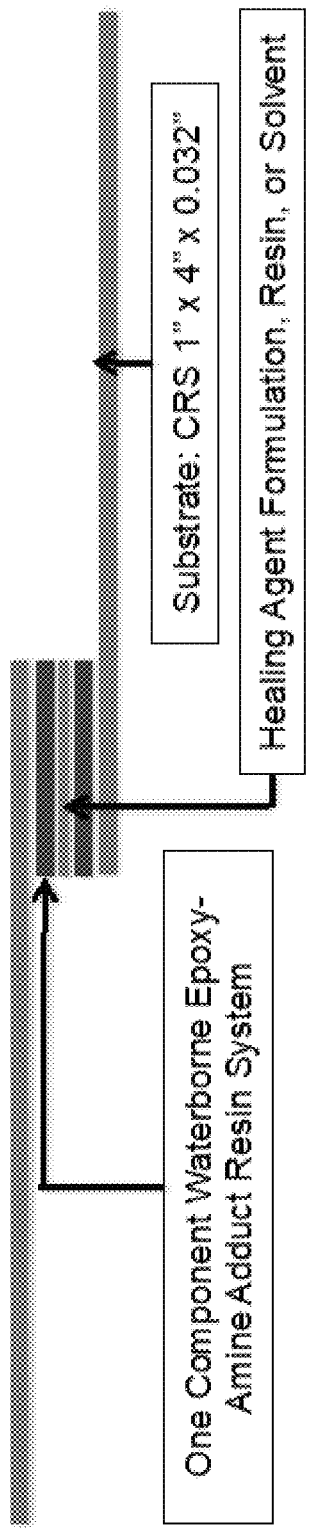

In a separate experiment, the cured epoxy-amine adduct resin system was molded into lap-joints and cured in order to determine the extent of oligomeric chain entanglement and crosslinking afforded by the healing agent formulation (formulation included within the capsules) and individual components. The experiment is described in detail in Example 3 and a schematic exhibiting the construction of the lap joint is shown in FIGS. 3A-3C.

Figure 4:
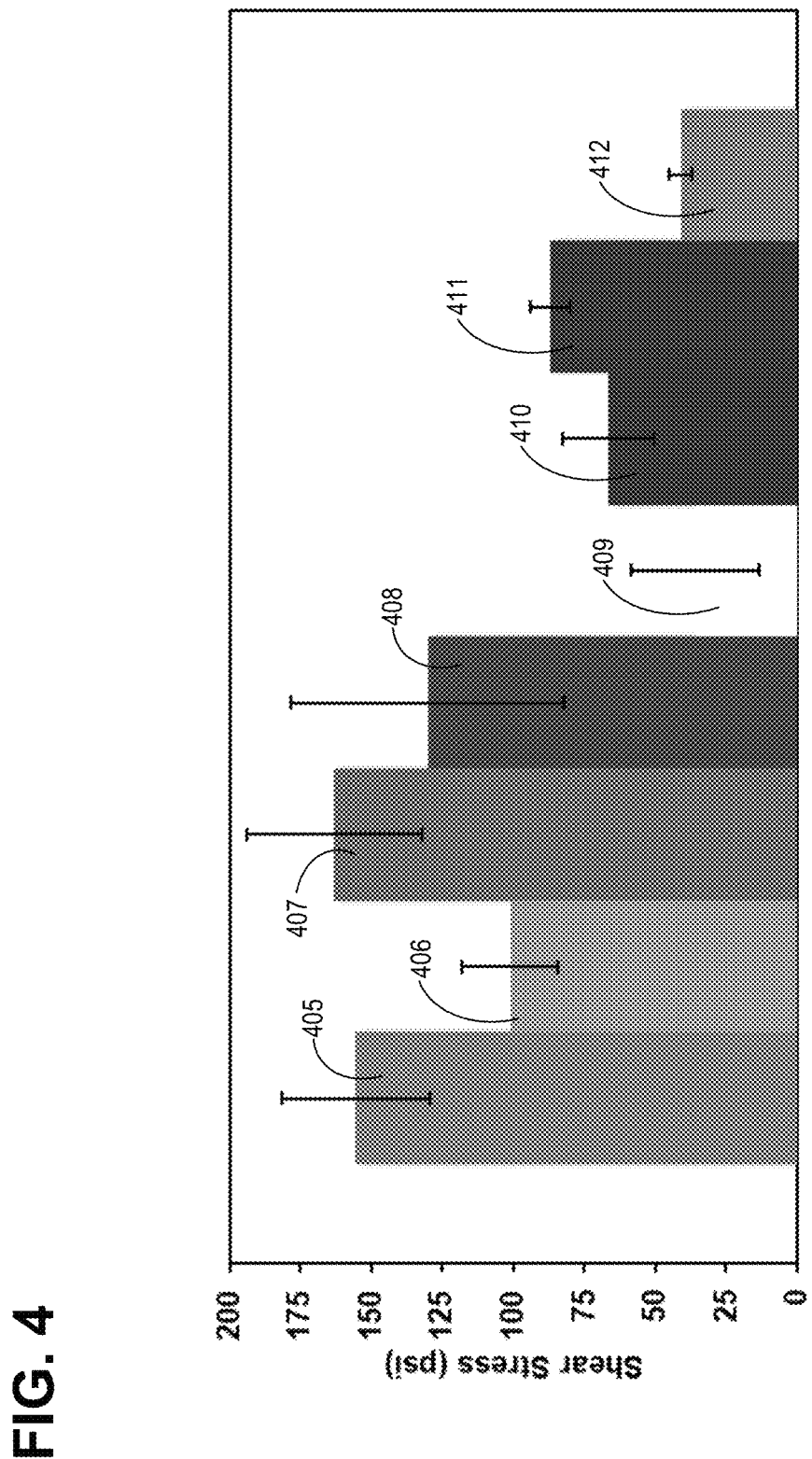
FIG. 4 is a graph showing a summary of results of lap-shear testing of the waterborne epoxy-amine adduct resin system. Lap joints were prepared as described in Example 3 and as shown in FIGS. 3A-3C. The summary of results includes two controls. For the first control, the one component waterborne epoxy-amine adduct resin was applied to the two pieces comprising the lap-joint followed by immediate assembly of the lap joint. The lap-joint was then allowed 6 days at ambient conditions prior to lap-shear testing (Control 1). For the second control (Control 2), following application of the one-component waterborne epoxy-amine adduct resin on the pieces of the lap joint, they were allowed to cure for 3 days, after which the pieces were assembled together to make the lap joint and allowed 3 additional days at ambient temperature prior to lap-shear testing. To assess the effect of the healing agent formulation, components and component solvent alternatives on the epoxy-amine adduct, lap-shear samples were prepared as described for Control 2, with the formulation being tested applied between the coated pieces of the lap joint prior to assembly. The formulations tested include: healing agent formulation; Bisphenol-A-(Epichlorhydrin) Epoxy Resin; Benzyl acetate; Hexyl acetate; Octyl acetate; and Phenyl ethyl acetate. As was done in the case of the control 2, the lap joint was allowed 3 days at ambient conditions prior to lap-shear testing.
Figure 5A:
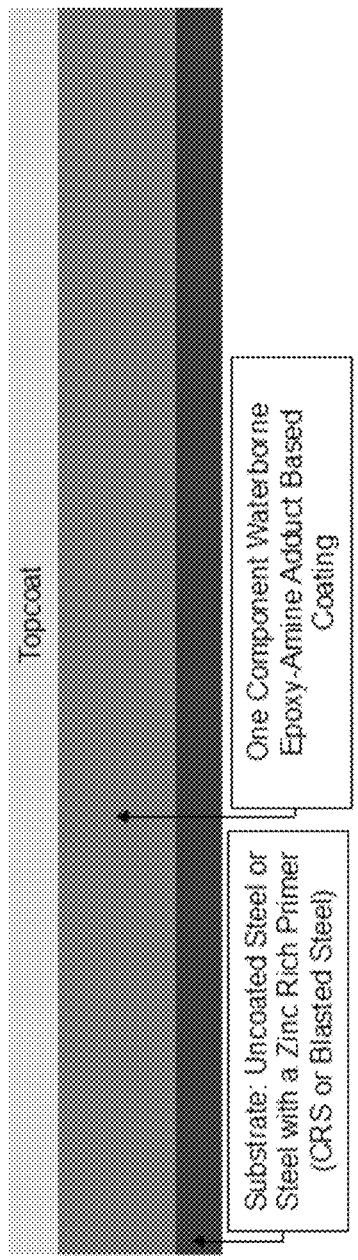
Figure 5B:
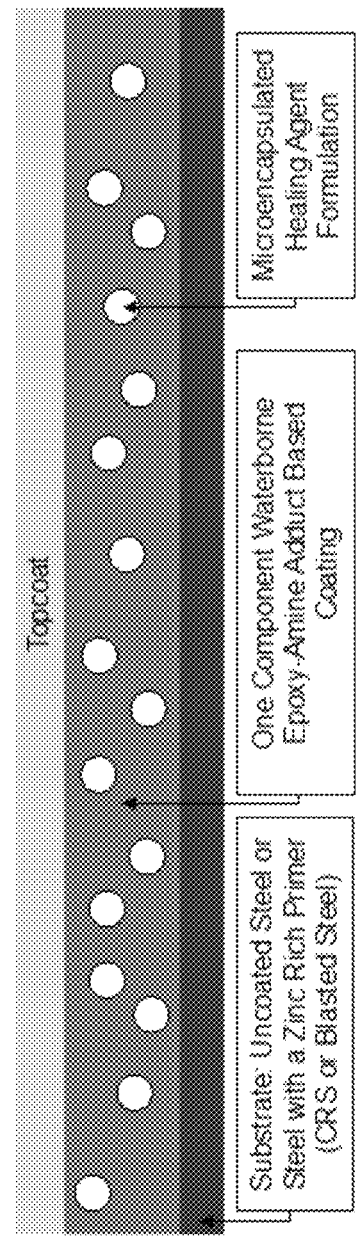

The results of lap-shear experiments performed with these samples are summarized in FIG. 4. The results showed that the introduction of the healing agent formulation between two steel substrates coated with the cured epoxy amine adduct resin system resulted in shear strength equal to that of the epoxy amine adduct resin system (Control 1) and stronger than the two cured films put together (Control 2). Furthermore, samples incorporating the healing agent were found to exhibit joints that were stronger than when any singular component was introduced. Control 1 is represented by numeral 405, Control 2 is represented by numeral 406, joints that included the healing agent formulation are represented by numeral 407, bisphenol-A-(epichlorhydrin), epoxy resin joints are represented by numeral 408, joints that included benzyl acetate are represented by numeral 409, joints that included hexyl acetate are represented by numeral 410, joints that included octyl acetate are represented by numeral 411, and joints that included phenyl ethyl acetate are represented by numeral 412.

The above-referenced synergy is harnessed and put into practical use by incorporating encapsulated healing agent into an epoxy-amine adduct-based coating formulation. A process by which the healing agent is encapsulated is provided in Example 4. The resulting microcapsules can be incorporated into a coating in either a dry or slurry form, and the processes used to add the capsules, in the dry and wet forms, to a coating formulation based on the epoxy-amine adduct resin system are provided in Example 5 and Example 6 respectively. In practice, the healing agent will remain within the capsules in the cured film in a quiescent form until the coating is damaged. Damage to the coating ruptures the embedded capsules releasing the healing agent into the site of damage. Once in the site of damage, the healing agent formulation plasticizes the epoxy-amine adduct coating, thereby promoting re-coalescence and crosslinking, as discussed above, to repair the damage and maintain adhesion and protection at the site of damage. The performance of the coating formulation was evaluated on steel (FIGS. 5A-5D), aluminum, concrete, and wood substrates (FIGS. 6A-6B).

Figure 7B:
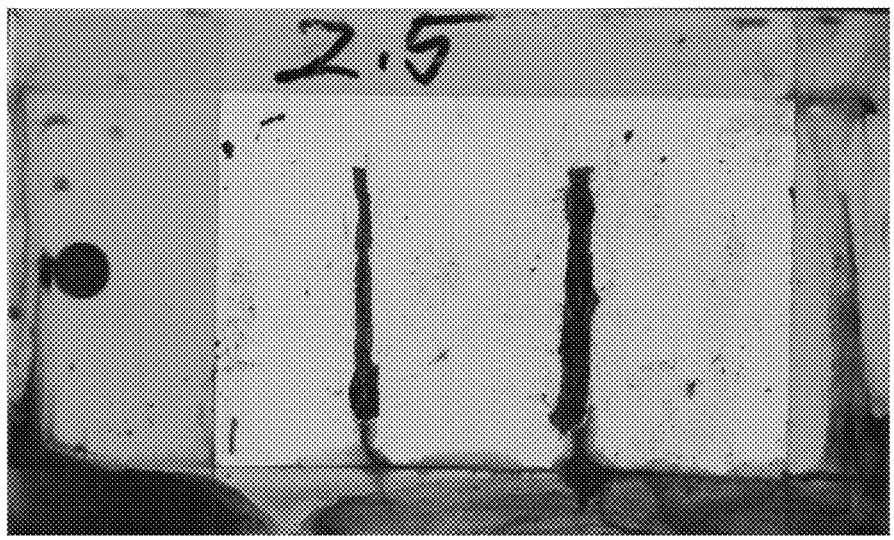
FIGS. 7A-7B are representative images showing adhesion loss from scribe of coated substrates after 1000 h of salt fog exposure (American Society for Testing and Materials (ASTM) B117) on cold-rolled steel (CRS) for one coat of a comparative one-component waterborne epoxy-amine adduct based coating formulation and an acrylic topcoat, and the formulation of the present disclosure incorporating 2.5 wt. % of the microencapsulated healing agent formulation and an acrylic topcoat.
Figure 7A:
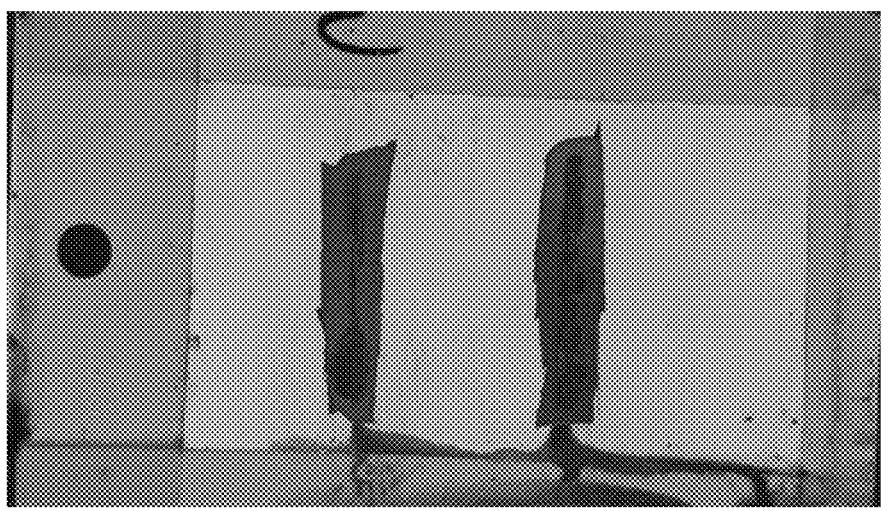
Figure 8B:
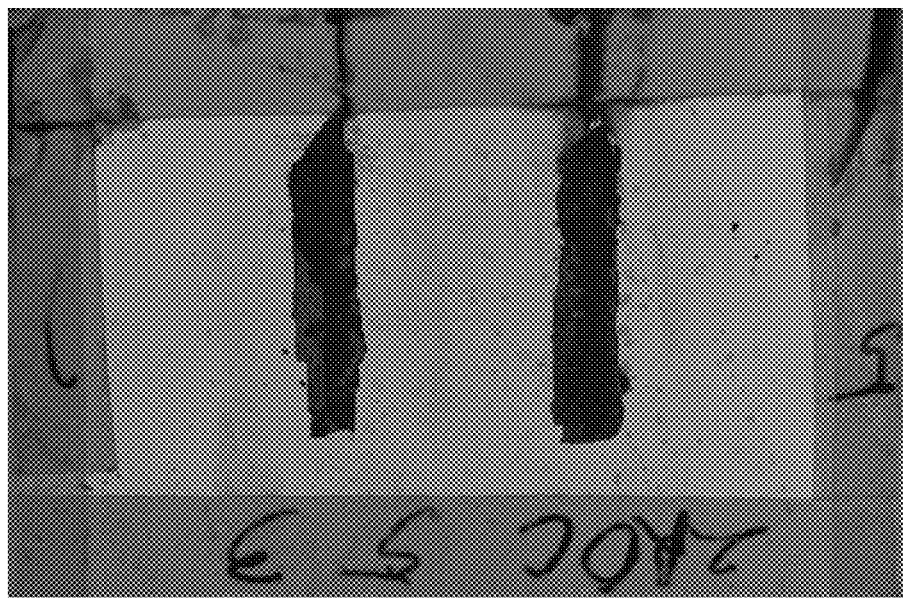
FIGS. 8A-8B are representative images of adhesion loss from scribe of coated substrates after 1000 h of salt fog exposure (ASTM B117) on blasted steel for two coats of a comparative one-component waterborne epoxy-amine adduct based coating formulation and a two-component solvent-borne hydroxyl-functional acrylic top coat, and the present version incorporating 5 wt. % of the microencapsulated healing agent formulation with a two-component solvent-borne hydroxyl-functional acrylic top coat.
Figure 8A:

To determine the effects of the encapsulated epoxy healing agent formulation on the corrosion performance of an epoxy-amine adduct-based coating system, coating formulations incorporating microcapsules in the dry and wet forms, at various loadings, were prepared and tested. Schematics representing the coating systems evaluated are provided in FIGS. 5A-5D. After curing, the coating systems were scribed and exposed to a salt fog for a specified exposure period. Results for these tests can be found in table 1300 at FIG. 13. Formulations incorporating the microencapsulated healing agent performed substantially better than otherwise identical formulations excluding the microencapsulated healing agent. Performance improvement ranged from 63% to 79% for abraded cold-rolled steel substrates (CRS, SSPC-SP3 substrate preparation), and between 55% and 82% for blasted steel substrates (SSPC-SP10 substrate preparation). Representative sets of images comparing the formulation excluding the microencapsulated healing agent (control) and the version incorporating the microencapsulated healing agent (inventive formulation) are provided in FIGS. 7A-7B (CRS), respectively, and FIGS. 8A-8B (blasted steel), respectively. Although formulations containing microcapsules that were incorporated in the wet and dry forms were evaluated, these formulations performed equivalently.

Figure 9B:
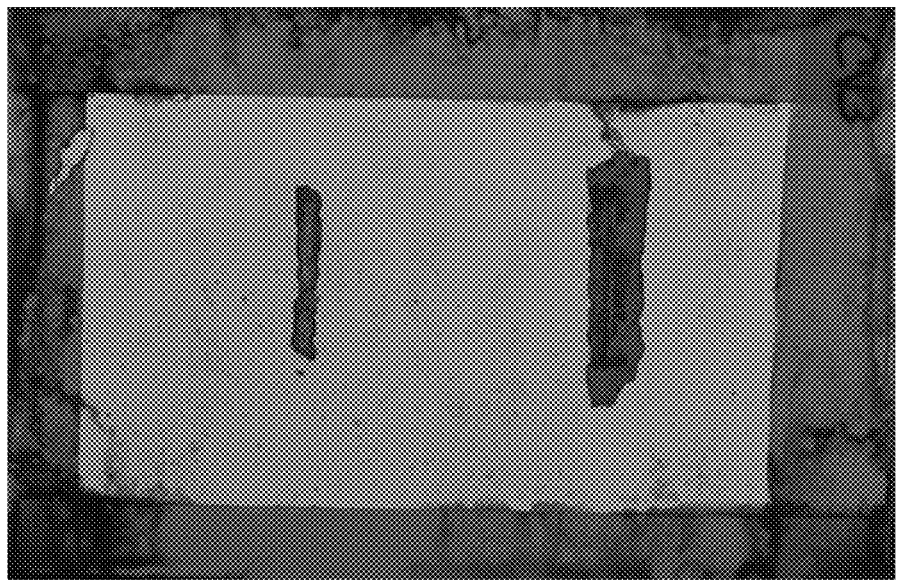
FIGS. 9A-9B are representative images of adhesion loss from scribe of coated substrates after 1000 h of salt fog exposure (ASTM B117) on blasted steel with a zinc-rich primer and either a comparative one-component epoxy-amine adduct-based coating or the formulation of the present disclosure incorporating 2.5 wt. % of the microencapsulated healing agent formulation as a build coat, and a hydroxyl-functional acrylic topcoat in both cases.
Figure 9A:
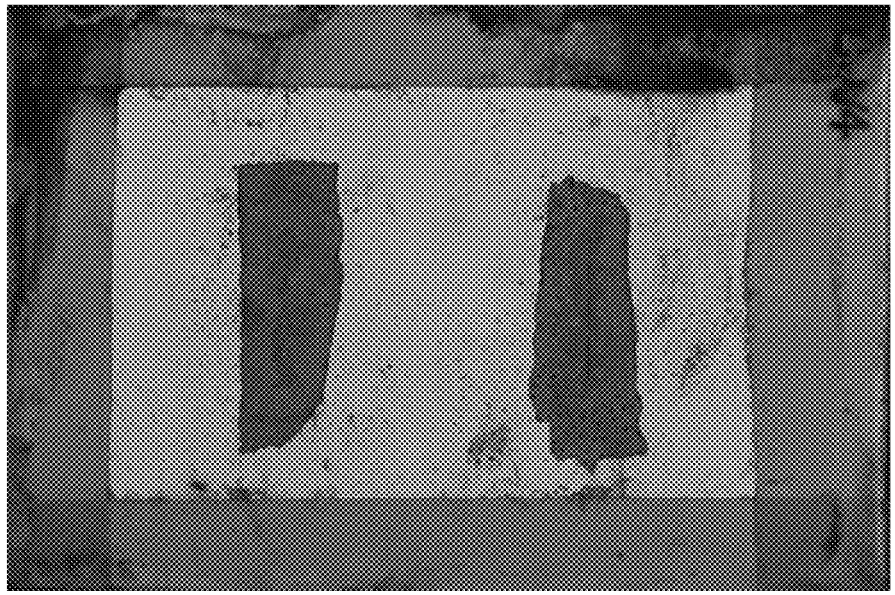
Figure 10B:
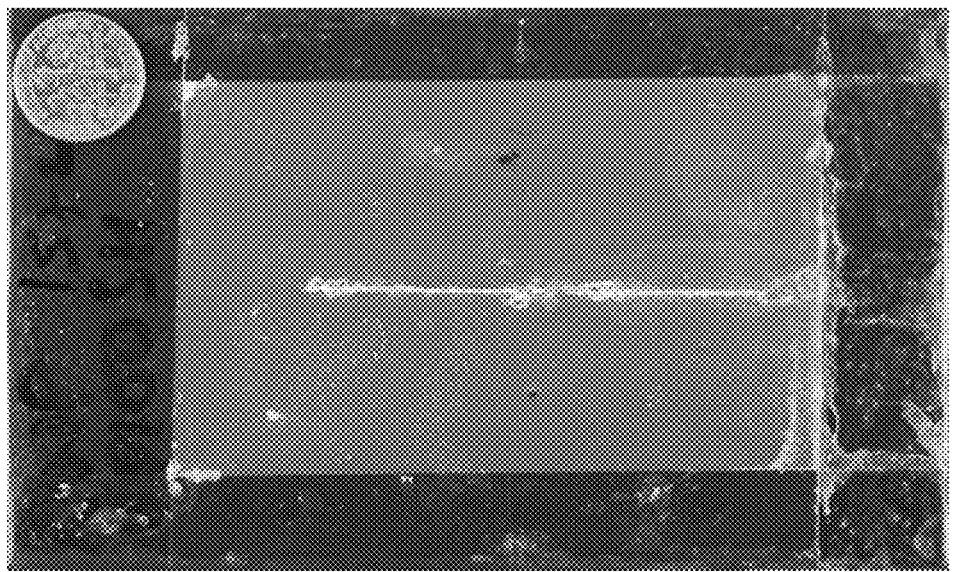
FIGS. 10A-10B are representative images showing substrate corrosion away from the scribe for coated aluminum 2024-T3 substrates after 1500 h of salt fog exposure (ASTM B117).
Figure 10A:
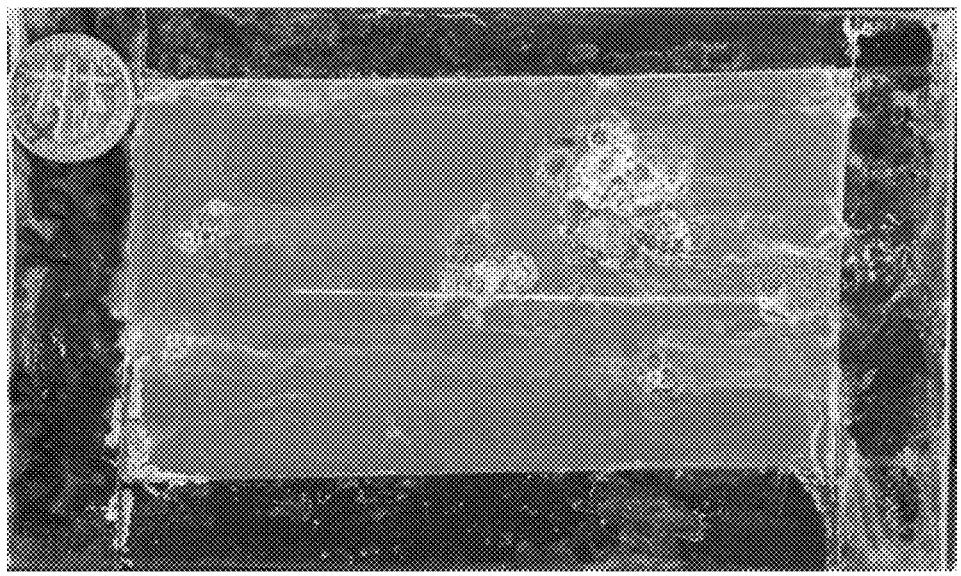
Figure 11B:
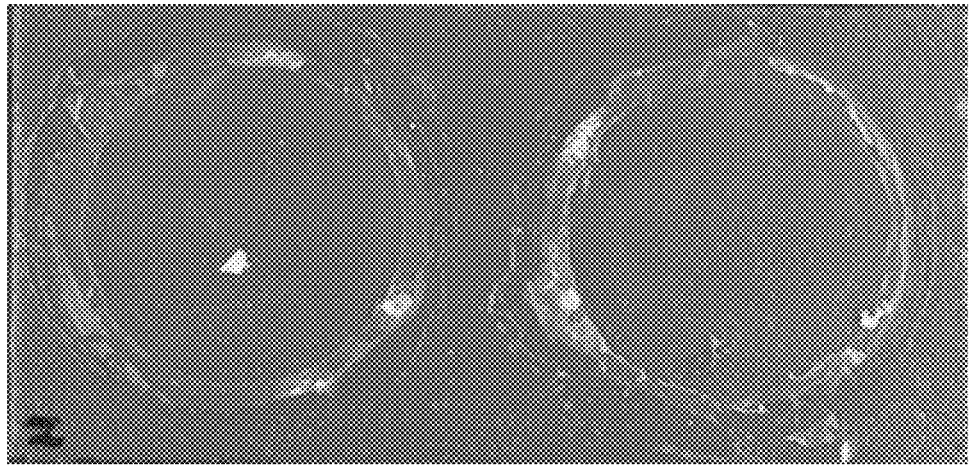
FIGS. 11A-11B are representative images of coated concrete substrates after 7 days of ponding exposure.
Figure 11A:
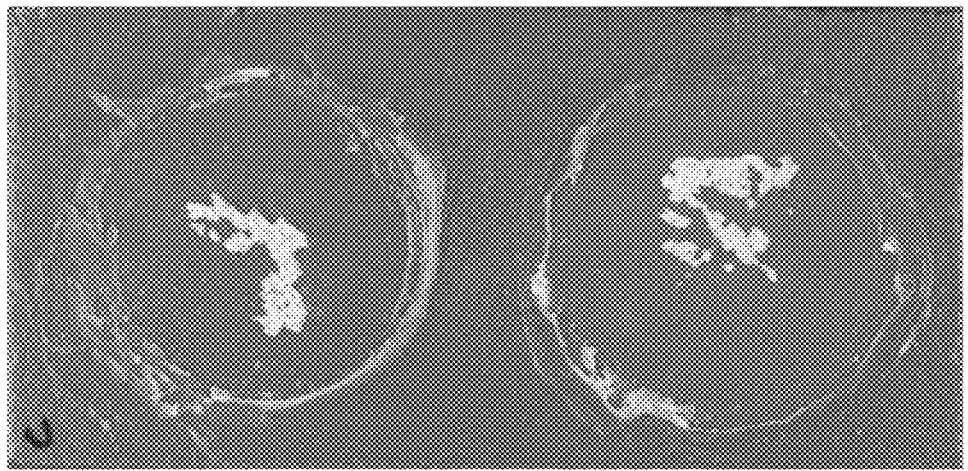
Figure 12A:
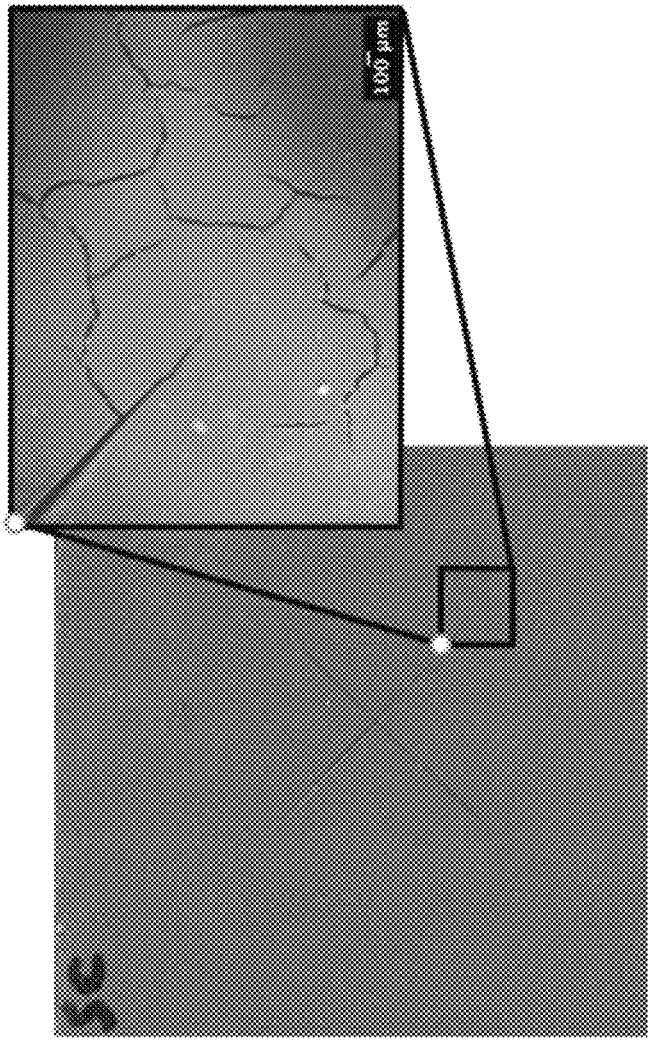
FIGS. 12A-12B are representative images and micrographs of coated wood substrates after 1 cycle of soaking and freeze exposure.
Figure 12B:
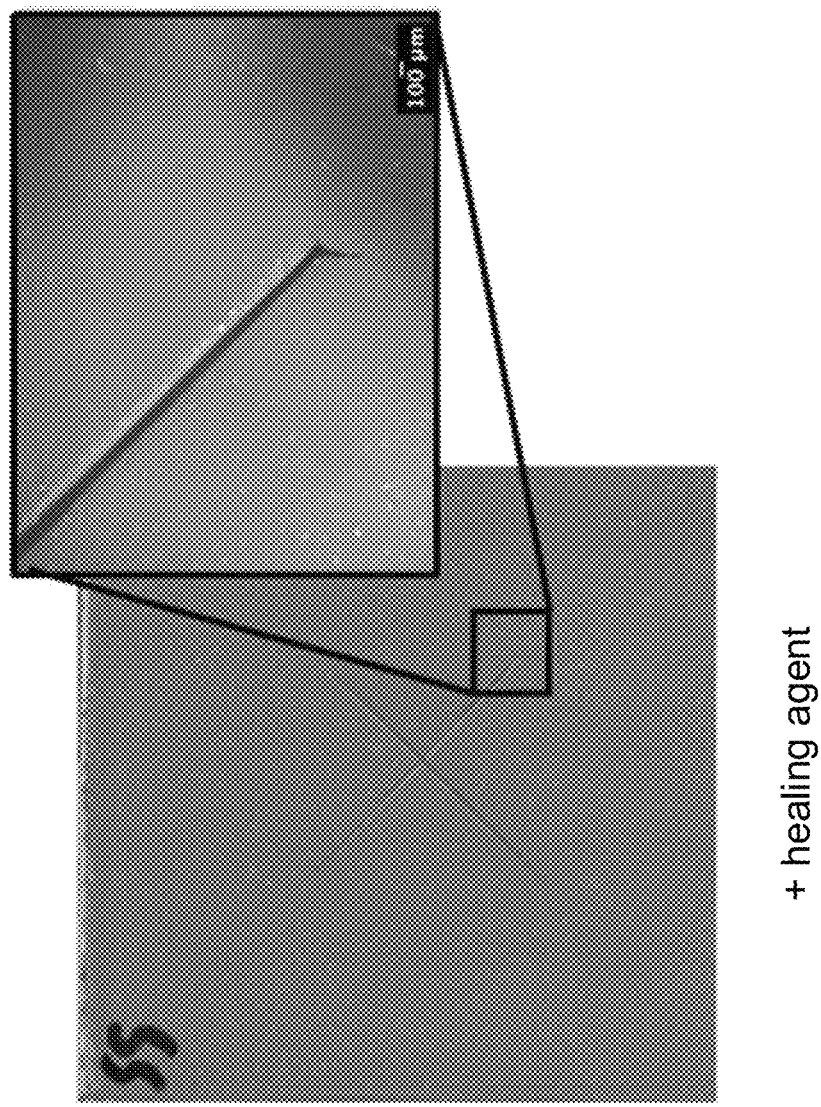

To further illustrate the use and versatility of the present formulations, formulation samples were further evaluated on steel substrates primed with a zinc-rich primer, aluminum 2024-T3, concrete, and wood substrates. In the case of the zinc-rich primed substrate, the present formulations facilitated improved inter-coat adhesion between the epoxy-amine adduct coating formulation and the underlying zinc-rich primer, which generally led to improved corrosion resistance (FIGS. 9A-9B). Corrosion resistance was also found to improve for aluminum 2024-T3 substrates coated with the present formulations relative to a comparative formulation (FIGS. 10A-10B). In the case of concrete substrates, a present formulation exhibited improved adhesion relative to the comparative formulation following 7 days of ponding exposure (FIGS. 11A-11B). For coated wood substrates, a present formulation was observed to maintain more cohesive integrity while the comparative example exhibited significant cracking around scribe damage to the coating (FIGS. 12A-12B).

EXAMPLES

Example 1. Differential Scanning Calorimetry

Samples were created for Differential Scanning calorimetry evaluation as follows: The standard Bisphenol-A-(Epichlorohydrin) epoxy resin was measured out into a Tzero aluminum pan. The cured one-component waterborne epoxy-amine adduct resin was prepared by first casting the epoxy-amine adduct resin onto Polytetrafluoroethylene (PTFE) sheets followed by curing over a sixteen-hour period at 60° C. The resulting polymeric film was then removed from the PTFE sheets and crushed by mortar and pestle into a coarse powder. This powder was then measured into a Tzero aluminum pan. A 1:1 mixture of the Bisphenol-A-(Epichlorohydrin) epoxy resin and the one-component waterborne epoxy-amine adduct resin was prepared by mixing equal portions by weight of the standard epoxy resin and the cured one component waterborne epoxy resin in a separate container for a period of 60 seconds, followed by measuring out into a Tzero aluminum pan. Separate DSC experiments were performed on these via a ramp method starting at ambient temperature and ramping up to 300° C.

at a rate of 10° C./min. Data from these tests were then plotted and compared (see FIG. 1).

Example 2. Solvent Swelling Evaluations

Solvent swelling experiments were performed on a set of cured epoxy-amine adduct resin films by first casting the epoxy-amine adduct emulsified resin onto PTFE sheets and curing over a sixteen-hour period at 60° C. Following curing, the polymeric films were removed from the PTFE sheets and crushed by mortar and pestle into a coarse powder. This powder was then added to a vial at a specified weight. A specified solvent (water, benzyl acetate, hexyl acetate, octyl acetate, or phenyl ethyl acetate) was added to each vial to create a 1 to 9 ratio of resin to solvent. These components were mixed together using a tongue depressor for 30 seconds and then were sealed with a cap. The resulting mixture was allowed to equilibrate at ambient lab temperature and was observed over time.

Example 3. Lap Joint Preparation and Testing

Lap joints used for lap-shear testing were prepared using 1"×4"×0.032" cold rolled steel (CRS) substrates. These substrates were marked via a score mark created by calipers set to 1 inch. A sample of the waterborne epoxy-amine adduct resin was then applied to these substrates from the edge of the panel to the scored mark creating a 1"×1" coated surface on each substrate. To assemble a lap-joint, two of these substrates were paired together. For the first control evaluated (Control 1), the coated substrates were assembled to form a lap-joint immediately after coating the component substrates with the waterborne epoxy-amine adduct. For the second control (Control 2), the lap-joint was assembled after allowing the coated component substrates to cure at ambient temperatures for 3 days. For the healing agent or components evaluated, 0.1 g of each formulation was applied on one substrate of the pair in the 1"×1" coated area. The second substrate's coated area was then positioned on top of the first, ensuring squareness and matching the coated areas such that only the coated 1"×1" areas of each substrate were in contact. All lap-joints prepared were held together by small binder clips and left to equilibrate for three days at ambient temperature. The binder clips were then removed prior to testing on a load frame in accordance to ASTM D1002.

Example 4. Microencapsulation of Healing Agent Formulations 200 mL of deionized $H_2O$ was measured into a clean 1000 mL container. 50 mL of a previously prepared solution of 5 wt. % poly(ethylene-co-maleic anhydride) (E400 EMA Copolymer) was added to the container. 5 g of urea, 0.5 g $NH_4Cl$, and 0.5 g of resorcinol (previously ground) were then added to the container and the solution was mixed until all the ingredients were completely dissolved. The pH of the solution was measured to be between 2.3 and 2.4 and it was adjusted to 3.5 by adding a 5 wt. % solution of NaOH drop-wise. The container was then set up in a water bath on a programmable hot plate. A mixer blade or homogenizer was placed in the container and started to apply shear to the solution at a specified rate (2000 RPM for 25-micron capsules and 6000 RPM for 10-micron capsules). The healing agent as described herein was then added to the container to form an emulsion. The emulsion particle size was measured using a microscope to ensure that it was in the desired range. After 10 to 15 minutes of milling, 12.77 g of 37 wt. % aqueous solution of formaldehyde was added to the container. 10 to 15 drops of octanol was added at regular intervals to prevent foaming. The hot plate was started to increase the temperature of the reaction mixture to 55° C. at a rate of 1° C./min (60° C./h). The timer was then set for 4 hours. After the completion of the reaction, the reaction mixture was cooled to room temperature before beginning the isolation process of the microcapsules. The reaction mixture was washed thoroughly to remove excess surfactant and any unreacted ingredients. Washed microcapsules were re-slurried with deionized water and spray-dried to obtain microcapsules in dry powder form or kept in a wet slurry form at 50 wt. % solids.

Example 5. Incorporation of Dry Capsules into Coating Formulation

Microcapsules in the dry final form were incorporated into the present coating formulation (e.g., epoxy amine-adduct resin system) at loadings of 2.5 wt. %, 4 wt. %, or 5 wt. % by first adding the required amount of microcapsules (2.5 g, 4 g, or 5 g) to half of the fully formulated coating (48.75 g, 48 g, or 47.5 g). The mixture was gently blended with a paddle mixer at a medium speed (about 800-1000 RPM) for 60 seconds. The other half of the coating formulation (48.75 g, 48 g, or 47.5 g) was then added to the mixture followed by additional mixing using the same mixing procedure already described. The resulting coating formulation was then applied on the target substrate.

Example 6. Incorporation of Wet Capsules (50 wt. % in Water) into Coating Formulation Microcapsules in the wet final form (50 wt. % capsules in water) were incorporated into the present coating formulation (e.g., epoxy amine-adduct resin system) at loadings of 2.5 wt. %, 4 wt. %, or 5 wt. % by adding first adding the required amount of microcapsules (5 g, 8 g, or 10 g) to half of the fully formulated coating (48.75 g, 48 g, or 47.5 g). The mixture was gently blended with a paddle mixer at a medium speed (about 800-1000 RPM) for 60 seconds. The other half of the coating formulation (48.75 g, 48 g, or 47.5 g) was then added to the mixture followed by additional mixing using the same mixing procedure already described. The resulting coating formulation was then applied on the target substrate.

Example 7. Ferrous Substrate Preparation, Coating Application, Scribing, and Testing SSPC-SP3 CRS steel substrates were prepared by abrading the substrates using an 80-grit belt sander in four directions. The substrates were then cleaned with acetone using a lint free cloth. Compressed air was then applied over the substrate to remove any remaining dust particles. SSPC-SP6 and SSPC-SP10 substrates were acquired already blasted. These substrates were simply cleaned using acetone and a lint free cloth. Compressed air was then applied over the substrate to remove and remaining dust particles.

One-component waterborne epoxy-amine adduct formulations in accordance with embodiments herein were applied via a gravity feed conventional spray gun with a 1.8 mm nozzle and 60 psi air pressure. Top coats were applied via a gravity feed conventional spray gun using the same settings. In general, tested coating systems, whether one-coat, two-coat, or three-coat were allowed to cure for 7 days, following coating application, prior to damage. Each panel was damaged by scribing using a 156 μm van Laar scribe tool and a 500 μm Sikkens type scribe tool fitted into an Erichsen model 639 panel scratcher. The scribes were 1 inch in length and 2 inches apart. The panels were allowed to equilibrate at room temperature for 24 hours. Uncoated areas of the panels were sealed using a clear polyester sealing tape. The panels were then subjected to ASTM B117 testing for up to 2000 h. After ASTM B117 testing, CRS panels were evaluated for loss of adhesion as outlined in ASTM D1654, Procedure A, Method 2. A rounded spatula held perpendicular to the panel surface and parallel to the scribe was used to remove loosely adhered coating. A sliding caliper was used to measure the loss of adhesion from six points along the scribe. Three panels were evaluated for each formulation tested at each exposure duration and the average of all measurements were reported.

Example 8. Aluminum Substrate Preparation, Coating Application, Scribing, and Testing Aluminum 2024-T3 substrates were prepared by cleaning with acetone using a lint free cloth, followed by application of compressed air applied over the surface to remove any remaining dust particles prior to application. The one-component waterborne epoxy-amine formulations were applied via a gravity feed conventional spray gun with a 1.8 mm nozzle and 60 psi air pressure. Tested coating systems were allowed 7 days at ambient conditions to cure prior to damage. Each panel was damaged by scribing using a 500 μm Sikkens type scribe tool fitted into an Erichsen model 639 panel scratcher. Each panel received one scribe that was 2.5 inches long. The panels were allowed to equilibrate for 24 h at ambient temperature after damage and all uncoated areas were sealed using clear polyester sealing tape and then placed into ASTM B117 testing for up to 1500 h. After ASTM B117 testing, the panels were evaluated for loss of adhesion as outlined in ASTM D1654, Procedure A, Method 2. A rounded spatula held perpendicular to the panel surface and parallel to the scribe was used to remove loosely adhered coating. Representative images were taken of the resulting adhesion loss.

Example 9. Concrete Substrate Preparation, Coating Application, Scribing, and Testing Concrete substrates were prepared by applying compressed air over the substrate to remove dust particles. The one-component waterborne epoxy-amine formulations were applied via a gravity feed conventional spray gun with a 1.8 mm nozzle and 60 psi air pressure and allowed to cure for 7 days prior to damage. Each panel was damaged using a razor blade mounted into an Erichsen model 639 panel scratcher. The scribes were 1 inch in length and had a 90-degree intersection to create an X pattern. A plastic cylinder, with a 2 inch diameter and 3 inch height, was adhered to the surface of the panel to encompass the damaged area using silicone caulk immediately after damage. The panels were then allowed to equilibrate at room temperature for 24 hours. After this period of time, 100 ml of water was added to the cylinders and the open end of the cylinder was covered. After 7 days of soaking, the water was drained, the cylinders removed, and the samples were allowed to dry for 24 hours. The adhesion of the coating around the scribed areas on the panels was then evaluated by applying pressure sensitive adhesive tape over the scribed areas and rapidly removing the tape. The panels were then photographed to document any evidence of adhesion loss.

Example 10. Wood Substrate Preparation, Coating Application, Scribing, and Testing Wood substrates were prepared by sanding with 80-grit sandpaper both with and against the grain of the wood, followed by the use of compressed air to remove any dust particles. The one-component waterborne epoxy-amine formulations were applied via a gravity feed conventional spray gun with a 1.8 mm nozzle and 60 psi air pressure and allowed to cure for 7 days prior to damage. Each panel was damaged using a razor blade mounted into an Erichsen model 639 panel scratcher. The scribes were 1 inch in length and had a 90-degree intersection to create an X pattern. After damage the panels were allowed to equilibrate for 24 h at room temperature. The panels were then submerged in water and soaked for 8 hours then removed from the water and placed into a freezer for 16 hours. Finally, the panels were removed from the freezer and allowed to thaw and dry for 72 hours. The panels were then imaged using a camera and optical microscope to document changes in film properties.

In this way, one component waterborne resin systems comprising epoxy amine-adduct resin systems may be imparted with improved properties pertaining to adhesion efficacy onto substrates (e.g., steel, aluminum, wood, concrete, other metals, etc.) and corrosion resistance. The improved properties are realized upon some amount of degradation of a protective material that encompasses the one component waterborne resin system with incorporated microcapsules loaded with healing agent. Specifically, degradation of the protective material causes rupture of the microcapsules, and hence, release of the healing agent at the site of degradation. The components of the healing agent then react with the one components of the protective material, to improve at least adhesion and corrosion-resistance of the protective material to the substrate. These improvements are advantageous in terms of improving a protective quality with regard to the surfaces the protective materials are intended to safeguard. These improvements additionally are advantageous in that there is a growing demand for waterborne coatings due to reduced impact of such coating applications on the environment (e.g., reduction in VOCs), and reduced health, safety and environmental risks that otherwise accompany use of more traditional solvent-borne coatings. Accordingly, by improving the protective qualities of waterborne coatings as herein disclosed, the use of such waterborne coatings may increase relative to traditional solvent-borne coatings, which in turn may be advantageous for the above-mentioned reasons.

The technical effect of improving the protective qualities of waterborne coatings is realized by the specific components comprising the healing agent as herein disclosed, and the waterborne coating formulation. Specifically, the technical effect is realized via, upon release of the healing agent, reaction (e.g., crosslinking) between free amines corresponding to the epoxy-amine adduct resin system of the cured protective material, and the epoxy resin included as part of the healing agent. The technical effect is further realized via the inclusion of the polar aprotic solvent as part of the healing agent, which enables a swelling of the cured epoxy amine-adduct material that in turn enables newly established entanglement of oligomeric resin components of the epoxy amine-adduct resin system of the protective material.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A self-healing coating formulation, comprising:
    a one-component waterborne epoxy amine-adduct resin system; and
    a healing agent encapsulated within a microcapsule.

2. The self-healing coating formulation of claim 1, wherein the microcapsule further comprises a polymeric shell wall.

3. The self-healing coating formulation of claim 2, wherein the polymeric shell wall is comprised of one or more of urea-formaldehyde, melamine formaldehyde, polyacrylate, polyurea, and polyurethane.

4. The self-healing coating formulation of claim 1, wherein the healing agent further comprises:
    an epoxy resin;
    a polar aprotic solvent; and
    an alkoxysilane.

5. The self-healing coating formulation of claim 4, wherein the alkoxysilane is one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane.

6. The self-healing coating formulation of claim 5, wherein the alkoxysilane is a glycidyl alkoxysilane; and
    wherein the glycidyl alkoxysilane is one or both of 3-glycidoxypropyltrimethoxysilane and 3-glycidoxypropyltriethoxysilane.

7. The self-healing coating formulation of claim 4, wherein the polar aprotic solvent is one or more of benzyl acetate, ethyl phenyl acetate, phenylacetate, octyl acetate, and nitrobenzene.

8. The self-healing coating formulation of claim 4, wherein the epoxy resin further comprises bisphenol-A-(epichlorohydrin).

9. The self-healing coating formulation of claim 1, wherein the microcapsule is of an average diameter of 25 microns or less.

10. A method for protecting a substrate, comprising:
    applying a formulation to the substrate, the formulation including a one-component waterborne epoxy amine-adduct resin system and a healing agent encapsulated within a microcapsule comprised of a polymeric shell wall of a diameter between 5 and 50 microns, wherein the formulation hardens to form a protective material upon application to the substrate; and
    wherein degradation of the protective material results in rupture of the microcapsule at a site of the degradation and release of the healing agent, thereby protecting the substrate.

11. The method of claim 10,
    wherein the healing agent further comprises an epoxy resin, a polar aprotic solvent, and an alkoxysilane.

12. The method of claim 11, wherein release of the healing agent responsive to microcapsule rupture promotes a non-covalent entanglement of oligomeric components of the epoxy amine-adduct resin system and a covalent cross-linking reaction between the epoxy resin present in the healing agent and amine groups available in the protective material.

13. The method of claim 11, wherein the epoxy resin further comprises bisphenol-A-(epichlorohydrin);
    wherein the polar aprotic solvent is one or more of benzyl acetate, ethyl phenyl acetate, phenylacetate, octyl acetate, and nitrobenzene; and
    wherein the alkoxysilane is one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane.

14. The method of claim 10, wherein the polymeric shell wall is comprised of one or more of urea-formaldehyde, melamine formaldehyde, polyacrylate, polyurea, and polyurethane.

15. A method of maintaining adhesion of a protective material to a substrate following degradation of the protective material, comprising:
    applying, to the substrate, a one-component waterborne epoxy amine-adduct resin coating formulation that includes a healing agent encapsulated within a microcapsule, wherein the waterborne epoxy amine-adduct resin coating formulation hardens to form the protective material upon its application to the substrate; and
    wherein degradation of the protective material results in rupture of the microcapsule and release of the healing agent at a site of the degradation, thereby maintaining adhesion of the protective material to the substrate.

16. The method of claim 15, wherein the healing agent further comprises an epoxy resin, a polar aprotic solvent, and an alkoxysilane.

17. The method of claim 16, wherein rupture of the microcapsule and release of the healing agent maintains adhesion of the protective material to the substrate via chemical reaction between amine groups corresponding to the epoxy amine-adduct resin system and the epoxy resin of the healing agent, and a swelling of the protective material via the aprotic solvent that enables entanglement between oligomeric resin components of the protective material.

18. The method of claim 16, wherein the epoxy resin further comprises bisphenol-A-(epichlorohydrin);
    wherein the polar aprotic solvent is one or more of benzyl acetate, ethyl phenyl acetate, phenylacetate, octyl acetate, and nitrobenzene; and
    wherein the alkoxysilane is one or more of one or more of 3-glycidoxypropyltrimethoxysilane, 3-glycidoxypropyltriethoxysilane, 3-aminopropyltrimethoxysilane, 3-aminopropyltriethoxysilane, methacrylpropyltrimethoxysilane, and methacrylpropyltriethoxysilane.

19. The method of claim 15, wherein the microcapsule further comprises a polymeric shell wall that is comprised of one or more of urea-formaldehyde, melamine formaldehyde, polyacrylate, polyurea, and polyurethane; and
    wherein a diameter of the microcapsule is less than 25 microns.

* * * * *